D. W. ANDERSON.
STARTER FOR INTERNAL COMBUSTION ENGINES.
APPLICATION FILED DEC. 28, 1911.
1,061,716.
Patented May 13, 1913.
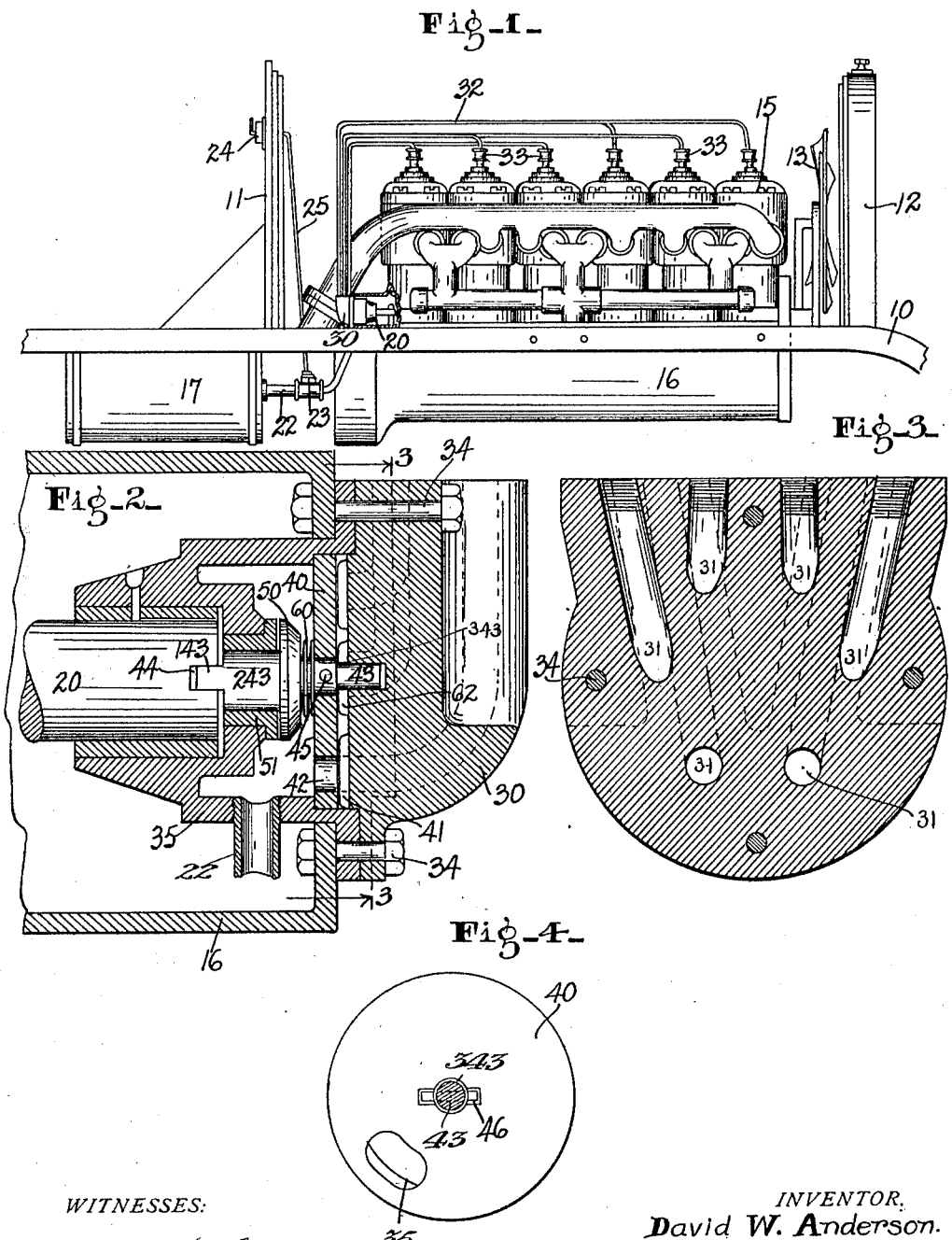
WITNESSES:
A. H. Edgerton
O. M. McLaughlin
INVENTOR.
David W. Anderson.
BY
V. H. Lockwood
ATTORNEY.

UNITED STATES PATENT OFFICE.

DAVID W. ANDERSON, OF LA FAYETTE, INDIANA.

STARTER FOR INTERNAL-COMBUSTION ENGINES.

1,061,716.  Specification of Letters Patent.  Patented May 13, 1913.

Application filed December 28, 1911. Serial No. 668,334.

*To all whom it may concern:*

Be it known that I, DAVID W. ANDERSON, a citizen of the United States, and a resident of La Fayette, county of Tippecanoe, and State of Indiana, have invented a certain useful Starter for Internal-Combustion Engines; and I do hereby declare that the following is a full, clear, and exact description thereof, reference being had to the accompanying drawings.

The object of this invention is to provide a valve mechanism for selectively regulating the passage of compressed air to the cylinders of an engine for starting the same, which valve mechanism is so constructed and arranged and associated with the adjacent parts thereof that there will be no appreciable friction or wear resulting from the movement thereof, even when the construction is such that the valve is actuated all of the time during which the engine runs.

The chief feature of the invention whereby said object is attained, consists in providing the parts of the valve so that they will normally run free and with slight frictional engagement with the associated parts, but will be moved up against the associated parts when the compressed air is admitted to the chamber in which the valve construction is mounted. When this occurs, the air forces the parts of the valve into a snug fit with the associated parts of the device so as to prevent leakage of air, but as soon as the compressed air is turned off, the parts of the valve can assume the non-frictional positions so that even if they are continuously operated while the engine runs, they will not wear materially.

In addition to utilizing compressed air for the purpose of holding the moving parts of the valve construction against adjacent parts of the mechanism, the selective valve may be slightly magnetized so that magnetism will hold it against the adjacent part containing the parts communicating with the engine cylinders, in such manner that the valve will be held in place from longitudinal movement away from its seat, but permitted to have ready rotary movement without any appreciable friction or wear. Also in addition to the foregoing a weak spring is provided herein for assisting in seating the parts of the valve construction. However, the magnetism of the selective valve and the weak spring referred to are not necessary in all constructions, the compressed air sufficing to seat the parts of the valve structure when the compressed air is turned into the chamber containing the valve structure.

The nature of the invention will be understood from the accompanying drawings and the following description and claim.

In the drawings, Figure 1 is a side elevation of a portion of the chassis of an automobile and of the engine mounted in connection therewith, and of a compressed air starting device for the engine, parts being broken away. Fig. 2 is a central vertical longitudinal section through the valve construction and associated parts, parts being broken away and parts of the valve being shown in their idle position. Fig. 3 is a transverse section on the line 3—3 of Fig. 2. Fig. 4 is an elevation of the selective valve in position.

There are shown in the drawings, for the purpose of illustrating the mounting and general relationship of my invention to the other device in connection with which it may be used, a portion of the chassis 10 of an automobile with a dash 11, a radiator 12, and a fan-shaped wheel 13. There is also shown a six cylinder engine 15 with a crank case 16. Also there is shown a compressed air tank 17 secured to the underside of the chassis, but the means for compressing the air therein is not shown.

The engine has the usual cam shaft 20 which is driven by the crank shaft, not shown, and at the end of the cam shaft the valve mechanism to which this invention relates, is mounted. It is immaterial, however, whether the valve mechanism be actuated by the cam shaft 20 or any other moving part of the engine. A pipe 22 leads from the compressed air tank 17 to the valve mechanism 21. In said pipe 22 there is a suitable cut off valve 23 in the nature of a lift valve, which is controlled by the operator through any suitable means such as a lever 24 mounted in connection with the dash 11 and operating through a connection 25 with the valve 23. This valve 23 and the means for operating it constitute no part of this invention as any other suitable means may be employed for turning on or off the compressed air through the pipe 22.

The valve mechanism, which is brought out more clearly in Fig. 2, has a member 30 containing ports and passageways 31 in communication with the tubes 32 which lead to the various engine cylinders. In each tube 32 there is a suitable check valve 33. The member 30, just referred to, is secured by bolts 34 to the crank case 16. Those bolts also pass through flanges from the valve case 35 which has a chamber into which compressed air enters through the tube 22. Said valve case 35 may also form a bearing for the end of the cam shaft 20.

Within the valve case there is a disk-like selective valve 40 which engages the bosses 41 surrounding the ports 31 in the face of the member 30 which projects into said valve case and in which the ports 31 are located, and closes said ports excepting as the port 42, through the valve 40, comes into registry successively with the ports 31 in communication with the engine cylinders. The valve case is peripherally recessed to furnish space for some longitudinal movement or play of the valve 40, as indicated in Fig. 2, so that said valve 40 can move out of engagement with the bosses 41 surrounding the ports 31. The selective valve 40 is rotated by the cam shaft 20 through an intermediate separate shaft 43 on which the valve 40 is loosely mounted. Said shaft 43 has a reduced portion at one end having bearing in the member 30, as shown in Fig. 2. At the other end of said shaft there is a flattened portion 143 which projects loosely into a rectangular recess 44 centrally located in the end of the cam shaft 20. Said mounting of the shaft 43, therefore, is such that it can have some longitudinal movement. It has an enlarged portion 243 and also a portion 343 between the enlarged portion and the reduced end, said part 343 being smaller than the enlarged portion 243 and may be larger than the reduced portion of the shaft 43, but does not have to be. The selective valve 40 is mounted on the portion 343 of the shaft 43 and that portion of the shaft has a pin 45 extending through it diametrically and projecting beyond it, and the valve 40 has two recesses 46 projecting in opposite directions beyond the central bore thereof, as shown in Fig. 4 to surround and accommodate the pins 45, the construction being such that the valve may have movement longitudinally of the portion 343 of the shaft 43 and yet the shaft will always impart revoluble movement to the valve. To prevent leakage of air through the cam shaft bearing a disk 50 is secured rigidly on the shaft 43 between the portions 243 and 343 of said shaft. It seats up against a bushing 51 when moved to the left, as shown in Fig. 2. On the side of the seat of the disk 50, the shaft 43 is larger than on the other side of the disk 50. The purpose of this is to give the right-hand side of the disk 50, as shown in Fig. 2, more surface than there is exposed on the left-hand side. Hence, when compressed air enters the valve casing, it will throw the disk 50 to the left, that is seat it and prevent any escape of air. When the disk 50 is thrown to the left, it moves the entire shaft 43 with it, but it does not move the selective valve 40, for the compressed air forces the valve 40 in the opposite direction against the bosses 41.

It will be readily understood that, when the engine is stopped, the port 42 in the valve 40 will be in registry with one of the ports 31 leading to the proper cylinder for starting the engine by admitting compressed air to the valve chamber. When this happens the further revoluble movement of the cam shaft and the valve 40 will bring the port 42 in said valve into successive registry with the ports 31 and compressed air will then pass into the proper cylinders of the engine. The compressed air will start the engine, but after the engine is under way and the compressed air turned off, the pressure will be equalized upon the opposite sides of the valve 40 and disk 50 and, therefore, they will ride comparatively free of their adjacent stationary parts, although continuously rotated by the cam shaft as long as the engine operates. This will reduce to a minimum the friction and wear between the valve 40 and the bosses 41 and between the disk 50 and the bushing 51. The only remaining friction will be in the shaft 43 and it may be extremely loosely mounted so that its friction will be negligible. This loose mounting of the disk 50 will prevent any escape of the air through the bearings when the compressed air enters the valve case.

The foregoing describes the normal working condition of said mechanism. Under certain conditions or for certain work, it may be desired to provide additional means for causing the valve 40 and the disk 50 to hug the seats. One of said means, which has heretofore been employed by me, is to magnetize the selective valve 40 not to a great degree, and thereby it will hug the bosses 41. The magnetic condition of the valve 40 will not tend to prevent its ready revolubility to any extent, although it will tend to prevent the valve from having longitudinal movement away from the bosses 41. Therefore, its magnetic condition would hold said valve seated lightly all of the time and yet there would be very slight friction to the revolution of the valve. The other means for seating said valve consists of a spring 60 surrounding the part 343 of the shaft 43 and pressing against both valve 40 and the disk 50. This spring should be very light so as to merely seat the valves and yet not create any great degree of friction.

There is a boss 62 on the member 30 surrounding the central bearing for the shaft 43 and of a greater diameter than the length of the slot 46 through the valve 40. Said bosses 41 and 62 project inwardly an equal amount and, therefore, the boss 62 will prevent a discharge of air through the slot 46 when the valve 40 is pressed against the bosses 41 and 62.

While compressed air is referred to herein, of course, the invention refers to compressed gas of any kind and, therefore, the word "fluid" is used in the claim to cover air and other gas.

I claim as my invention:

A starter for an internal combustion engine including a fluid distributing member having a supply port and discharge ports, a slotted valve mounted within said member for governing said discharge ports, a valve shaft slidably mounted in said member on which said valve is slidably mounted so as to be longitudinally movable thereon, a bearing for said shaft, a disk on said shaft adapted to engage said bearing to prevent leakage around the shaft, a spring around said shaft between the valve and disk pressing against the valve and disk, and a driving shaft with its ends slidably coupled with said valve shaft for driving the same.

In witness whereof, I have hereunto affixed my signature in the presence of the witnesses herein named.

DAVID W. ANDERSON.

Witnesses:
J. HAZEL WELLS,
O. M. MCLAUGHLIN.

Copies of this patent may be obtained for five cents each, by addressing the "Commissioner of Patents, Washington, D. C."